United States Patent Office 2,763,883
Patented Sept. 25, 1956

2,763,883

TREATED PAINT BRUSH AND PROCESS AND COMPOSITION FOR MAKING SAME

Otto E. Wolff, Sudbury, and Saul G. Cohen, Lexington, Mass.

No Drawing. Application November 9, 1953, Serial No. 391,114

18 Claims. (Cl. 15—159)

This invention relates to improved devices, such as brushes, for applying protective and decorative coatings, and to processes and compositions for rendering such devices less subject to the adverse effects of residual amounts of the coating materials.

Protective and decorative coatings usually embody a film-forming vehicle so constituted, chemically and physically, as to be capable of application as part of a freely flowing, essentially liquid mass and, when applied as a coating, of giving a dry, thin, flexible, durable film which adheres firmly to the surface to which it is applied. This vehicle also serves as a binder for such pigments as may be added to the coating composition to augment its protective and decorative effects.

Of the many vehicles now available, one of the earliest known and still most commonly used is the drying oil which oxidizes upon application to give the protective film. However, the very property which makes the drying oil so well suited as the film-forming vehicle of a coating composition poses a substantial problem in regard to the brush or other device which is used to apply it. Failure to promptly remove such residual coating material as remains on the bristles of the applicator tends to cause the bristles thereof to harden and to adhere to one another thereby impairing the usefulness of the applicator. To avoid this it is now necessary to subject the applicator bristles to a thorough cleaning subsequent to each use in order to remove all of the coating material or to prevent access of air to the bristles.

One of the objects of the present invention is, accordingly, the provision of products, processes and compositions for improving the resistance to hardening of applicator bristles in the presence of residual amounts of drying oil.

It is another object of the present invention to provide processes and compositions for so impregnating the bristles of an applicator as to inhibit the oxidation and hardening of so much of the drying oil of a protective or decorative coating as may remain on the bristles after use.

Although specific reference will hereinafter be made to paint and paint brushes, it is to be expressly understood that paint is only one form of protective and/or decorative coating which can be applied by means of the improved methods of the invention, and that paint brushes are only one form of applicator whose bristles can be improved in accordance with the present invention. The improvements herein disclosed are applicable to all types of coatings which embody materials that harden by oxidation and to various types of applicators comprising bristles as their applicator elements. For example, the process and composition of the invention may be satisfactorily used upon a roller-type applicator whose surface is formed of a material such as lamb's wool.

In general, paints consist of a liquid vehicle, such as linseed or other drying oil, one or more solid pigments dispersed throughout said oil and, in most instances, a volatile solvent to give the paint the proper flowing consistency and to permit its ease of application. When a paint has been applied, this solvent quickly evaporates leaving behind the pigment and the oil as a wet coating and this mixture gradually dries into an elastic, solid, tough skin due to the absorption by the oil of oxygen from the air.

In accordance with the present invention, the bristles of the brush are protected against the adhesion and stiffening produced by the hardening of the residual paint on the brush bristles by being suitably treated with an antioxidation agent. Antioxidation agents, as such, are a well known class of chemical reagents (see Encyclopedia of Chemical Technology, vol. 2, page 69). In general, the antioxidants are substances which slow the rate of oxidation of auto-oxidizable materials, and one important characteristic which they possess is their effectiveness in very low concentrations of the order of a few hundredths or thousandths of one percent. According to one theory of the operation of oxidation inhibitors, it is estimated that the molecules of an auto-oxidizable material, capable of reacting with oxygen, consist, at any instant, of a limited number that have been activated or rendered "hot" by absorption of energy. When reaction occurs the activating energy of the hot molecule is released and can be absorbed by another molecule of the oxidizable material. Thus, the absorption of a limited amount of energy from an extraneous source, as from heat or light, sets up a chain reaction that leads to the oxidation of a relatively large amount of material unless the chain is broken, for example, by the absorption of the activating energy in a side reaction. The antioxidant or inhibitor is conceived to function as a chain breaker, i. e., it is allegedly capable of receiving but not passing on the activating energy. If the average chain is very long, the intervention of a single molecule of antioxidant may serve to prevent the oxidation of many molecules of auto-oxidizable material with a consequent substantial slowing of the rate of oxidation.

According to the present invention, the antioxidant introduced into the bristles of the brush is selected from the class of antioxidants which are soluble in polar solvents, such as water or alcohol, and insoluble in nonpolar solvents, specifically drying oils and thinners. Drying oils are generally mixed glycerides of saturated and unsaturated fatty acids. Examples of such oils are linseed, tung, chia, fish, hemp-seed, oiticica, perilla, poppyseed, safflower, soybean, sunflower and walnut. The paint thinners are, chiefly, terpene solvents whose main constituents are $\alpha$- and $\beta$-pinene, that is they chiefly consist of hydrocarbons of the $C_{10}H_{16}$ series, of alcohols ($C_{10}H_{18}O$) derived by the hydration of the aforementioned hydrocarbons. Specifically, they include gum turpentine, wood turpentine, dipentene, pine oil and sulfate turpentine. In addition, mineral thinners, hydrocarbons derived from petroleum and having molecular weights, about 150, are frequently used.

Examples of satisfactory antioxidation agents which have the desired aforementioned solvency characteristics in relation to water, alcohol, drying oils and thinners are the phenolic antioxidants which have ortho- and para-hydroxyl groups and their oxidation products, the quinones. The prototype of phenolic antioxidants is hydroquinone, and other satisfactory phenols are pyrocatechol, pyrogallol, o-amino phenol, p-amino phenol, amino hydroquinone, hydroxy hydroquinone, 1,4 naphthohydroquinone, N-para-hydroxy-phenylglycine and N-para-amino-phenylglycine. Other satisfactory oxidation inhibitors are ascorbic acid, gallic acid, thiourea, sodium bisulfite and stannous chloride. The above-mentioned materials, and especially the phenolic antioxidants such as hydroquinone, can be applied directly to the bristles by soaking the latter in a simple water solution of the antioxidant and without any pretreatment of the brushes to facilitate penetration into the bristles and, when so applied, cause the bristles to remain pliable despite the presence thereon of drying oil.

It is important that the antioxidant penetrate into and be retained by the bristles not only to provide adequate protection for the bristles but to prevent leaching of the antioxidant into the paint applied by the brush and the attendant inhibition of the drying thereof. By treating the bristles during, after or prior to the application of the antioxidant with a penetrant or swelling agent for the bristle, it becomes possible to greatly improve the results obtained. The penetrant acts to increase the amount of the antioxidant which enters the bristles and also serves to retain the antioxidant within the bristles so that the activity of the antioxidant is essentially restricted to the material in contact with the bristles and does not extend to the material applied by the bristles. As a result, the drying properties of the coating which is applied by the bristles are not adversely affected. Especially useful as penetrants for this purpose are water-soluble metallic sulfides such as sodium sulfide, and the water- and alcohol-soluble mercaptans which may be represented by the formula R—SH, where R is an organic group.

There are several types of mercaptans which may be satisfactorily employed. Among these are the mercaptans containing carboxylic groups, as, for example, mer-capto-acetic acid (thioglycolic acid) and mercapto succinic acid; mercaptans containing sulfonic groups, as, for example, sodium mercapto-ethyl sulfonate; salts of mercaptans containing amino groups which may be primary, as for example the salt of β-aminoethyl mercaptan; or secondary, as for example β-mercapto-ethyl-methyl amine, or tertiary, as for example the salt of β-mercapto-ethyl-dimethyl amine; mercaptans containing hydroxyl groups such as β-mercapto-ethyl alcohol and mercapto-glycerol; mercaptans containing carbonyl groups, such as mercapto-di-methyl ketone; mercaptans containing ether groups, such as β-mercapto-di-ethyl ether; mercaptans containing more than one of the foregoing substituted groups, as for example 3-amino-2-hydroxy-propyl mercaptan; mercaptans having a plurality of mercapto and other functional groups, such as tri-thio-hexitols; mercaptans containing quaternary ammonium groups such as mercaptoalkyl betaines, and thiourea. The mercaptans are preferably applied in solution in concentrations of approximately 15% or less, said solutions preferably having a pH range of from 5 to 10.

Where the treatment of the bristles can be effected under carefully controlled factory conditions, certain of the sulfides, whose fumes would be too toxic for ordinary use, can be employed as penetrants. Examples of such materials are sodium hydrogen sulfide and ammonium hydrogen sulfide. However, the preferred class of mercaptans are those which have substituents which lower the vapor pressure and decrease the odor, and include those which have, in addition to the mercaptan groups, a plurality of polar groups, vis., mercapto-glycerol and tri-thio-hexitols which have several hydroxyl groups, and mercapto-succinic acid which has two carboxyl groups, and those which have nonvolatile salt groups such as the mercaptoalkyl betaines and sodium mercaptoalkylsulfonate.

Bristles of the applicator may be subjected to the action of the penetrant just prior or just after the application of the antioxidation agent but the penetrant is preferably applied to the applicator bristles concurrently with said agent by being contained in the same solution with said agent.

The bristles of the brush or other applicator may be soaked for a period of several hours in a solution comprising a suitable solvent, such as water, the antioxidation agent and the penetrant. After soaking, the bristles are preferably washed in water and dried. At this stage, the bristles are pliable and the brush may be shaped as desired, for example splayed bristles may be brought to a chisel point. It is preferable too, after the brush is dried, to shake out any crystals of the material which may have precipitated on the bristles.

It may be desirable in some instances to offset any appreciable softening effect of the penetrant upon the bristles, to treat the bristle after it has been subjected to the action of the penetrant with a dilute solution of an oxidizing agent such as sodium hypochlorite, hydrogen peroxide or sodium chlorate.

A brush treated in accordance with the present invention may be used over and over again for applying a paint or other coating material containing an oxidizable material as its vehicle, and the only precaution that need be taken to preserve the pliability of the brush is to brush off excess paint from the brush immediately after the latter is used. In the event the coating composition contains a thinner, there may be a superficial stiffening of the brush bristles with time due to the volatilization of this thinner but the inherent pliability of the bristles will remain unaffected and such residual paint as may be on the bristles will remain soluble in the thinner so that the original overall pliability of the bristles will return when the brush is immersed again in thinner or in thinned paint.

The treatment herein described is effective to protect the bristles of a brush for a period as long as and longer than three months, and the treatment may be repeated to renew the protection offered the brush bristles. In order to obtain the most satisfactory results it is desirable, prior to the retreatment of the brush bristles, to remove from the bristles a substantial portion of the residual paint, as by washing the brush first in paint thinner and then in soap and water.

As illustrations of compositions and methods of treating brush bristles according to the present invention, the following specific examples are given:

*Example 1*

A saturated solution of hydroquinone in water is formed at room temperature and to 125 cc. of this solution there is added 10 cc. of thioglycerol. A paint brush having natural bristles is soaked in this solution over night. After being thus soaked, the bristles are washed in water, excess water is then removed from the brush, as by shaking, and the brush is hung to dry. At this stage the brush bristles may be shaped as desired. At the completion of the drying, the brush bristles are pressed on a flat surface in dry condition to free any crystalline deposit that may be located between the bristles. A brush so treated may be used over a prolonged period without careful cleaning. It is preferable to remove the bulk of the excess paint after each use as by a few strokes on a paint-free surface. No other washing or treatment is necessary to preserve the pliability of the brush bristles for a period of several months, depending, to some extent, on the amount of use to which the brush is put. More frequent use tends to wash out the protective material somewhat sooner than a less regular use. When the paint on the tips of the bristles tends to harden, the brush may be retreated. This operation is performed by first washing the brush bristles in a suitable thinner and following this by washing in soap and water. The brush is then subjected to the aforementioned treatment in the above-described solution, and becomes useful for another period of several months.

*Example 2*

A saturated solution of hydroquinone in water, free of penetrant, is used as the treating solution for a paint brush having natural bristles, the latter being soaked in this solution for approximately sixteen hours. After being thus soaked, the bristles are washed in water, excess water is then removed from the brush, as by shaking, and the brush is hung to dry. At the completion of the drying, the brush bristles are pressed on a flat surface in dry condition to free any crystalline deposit that may be located between the bristles. A brush so treated may be used over a prolonged period without careful cleaning. It is preferable to remove the bulk of the excess paint after each use, as by a few strokes on a paint-free surface. No other washing or treatment is necessary to preserve the pliability of the brush bristles for a period of approximately two months.

The use of the penetrant extends the period of effectiveness of the antioxidation agent within the bristles and thus extends the life of the brush between treatments. It serves the further function of softening the bristles to permit them to be suitably shaped and, in the absence of such shaping, the bristles of the brush are apt to splay during use. For this reason it is desirable in some instances to treat the bristles of the brush with the penetrant alone in order to shape the brush so as to correct for undue splaying.

*Example 3*

Saturated solutions of hydroquinone and stannous chloride are mixed in equal parts at a temperature of approximately 70° F. and the bristles of the paint brush are immersed in this solution for a period of from five to eight hours. After soaking, the bristles are treated as in Example 2.

*Example 4*

In lieu of the mixture of saturated solutions of Example 3, there may be substituted a saturated solution of metol and the brush bristles immersed in this solution for a period of approximately twenty-four hours.

*Example 5*

A solution is formed consisting of:

Hydroquinone _____grams__ 2
Thioglycolic acid_____do____ 2
Water _____cc__ 300

The brush is immersed in this solution for a period of from twelve to twenty-four hours and then subjected to further treatment, described in Example 2.

Since certain changes may be made in the above processes and compositions without departing from the scope of the invention herein involved, it is intended that all matter contained in the above description shall be interpreted as illustrative and not in a limiting sense.

What is claimed is:

1. A process for treating an applicator, such as a paint brush and the like, for applying protective coating compositions, such as paints and the like, said applicator comprising a plurality of bristles which serve as the elements for applying said compositions, said process so treating said bristles as to substantially improve their resistance to hardening when used to apply a protective coating composition having, as a vehicle, drying oils adapted to harden by oxidation, said process comprising the steps of treating the said bristles with a composition comprising an antioxidation agent for drying oils which is substantially insoluble in drying oils and which is dissolved in a polar solvent from the class consisting of water and the alcohols, at some stage of the process before removing the said composition from said bristles subjecting the latter to a penetrant from the class consisting of the metallic sulfides and the mercaptans to thereby increase the amount of antioxidation agent which is retained by the bristles, and allowing the treated bristles to dry so that the antioxidation agent which has penetrated the bristles is retained thereby.

2. The process of claim 1 wherein the antioxidation agent is a phenolic compound.

3. The process of claim 1 wherein the antioxidation agent is a phenolic compound having ortho- and para-hydroxyl groups.

4. The process of claim 1 wherein the antioxidation agent is hydroquinone.

5. The process of claim 1 wherein the penetrant is thioglycerol.

6. The process of claim 1 wherein the penetrant is thioglycolic acid.

7. A process for treating the bristles of a paint brush to improve their resistance to hardening when used for applying protective coating compositions which comprise a drying oil as a film-forming vehicle, said process comprising the steps of immersing the said bristles in an aqueous solution of a water-soluble antioxidation agent for drying oils and a water-soluble penetrant from the class consisting of the metallic sulfides and the mercaptans, said antioxidation agent and said penetrant being substantially insoluble in drying oils, keeping said bristles immersed in said last-named composition until the antioxidation agent has penetrated said bristles, and thereafter removing the bristles from said composition and allowing said bristles to dry so that the antioxidation agent which has penetrated the bristles is retained thereby, said penetrant increasing the amount of antioxidation agent which is retained by the bristles.

8. The process of claim 7 wherein the solution has a pH of from 5 to 10 and is substantially saturated with said antioxidation agent, the penetrant being a mercaptan and being present in a concentration up to approximately 15% by weight of said solution.

9. As a new product, a paint brush for applying coating compositions which have a drying oil as their film-forming vehicle, said paint brush comprising a plurality of bristles and an antioxidation agent for drying oils contained in said bristles, said agent being substantially insoluble in drying oils.

10. The product of claim 9 wherein said agent is a phenolic compound.

11. As a new product, an applicator for applying coating compositions which have a drying oil as their film-forming vehicle, said applicator comprising a plurality of bristles which comprise the elements for applying said compositions and an antioxidation agent for drying oils contained in said bristles, said antioxidation agent being substantially insoluble in drying oils.

12. As a new product, an applicator for applying coating compositions which have a drying oil as their film-forming vehicle, said applicator comprising a plurality of bristles which comprise the elements for applying said compositions and an antioxidation agent for drying oils contained in said bristles, said antioxidation agent being a phenolic compound having ortho- and para-hydroxyl groups and being substantially insoluble in drying oils.

13. As a new product, an applicator for applying coating compositions which have a drying oil as their film-forming vehicle, said applicator comprising a plurality of bristles which comprise the elements for applying said compositions and an antioxidation agent for drying oils contained in said bristles, said antioxidation agent being hydroquinone.

14. A new composition for treating the bristles of applicators comprising an antioxidation agent for drying oils which is substantially insoluble in drying oils, a penetrant from the class consisting of the metallic sulfides and mercaptans which are substantially insoluble in drying oils, and a polar solvent from the class consisting of water and the alcohols in which said antioxidation agent and said penetrant are dissolved.

15. The composition of claim 14 wherein the antioxidation agent is a phenolic compound having ortho- and para-hydroxyl groups.

16. The composition of claim 14 wherein the antioxidation agent is hydroquinone and the penetrant is thio glycerol.

17. The composition of claim 14 wherein the penetrant is thio glycolic acid.

18. The composition of claim 14 wherein the solution has a pH of from 5 to 10 and is substantially saturated with said antioxidation agent, the pentrant being a mercaptan and being present in a concentration up to approximately 15% by weight of said solution.

References Cited in the file of this patent

UNITED STATES PATENTS

| | | |
|---|---|---|
| 2,010,805 | Ow-Eschingen | Aug. 13, 1935 |
| 2,535,869 | Schneider et al. | Dec. 26, 1950 |
| 2,655,443 | Simon et al. | Jan. 12, 1954 |

OTHER REFERENCES

Chemical Abstracts, 46, 8387$^a$, September 1952.